Oct. 24, 1944.  W. BRAUER  2,361,171

UNIVERSAL MILLING ATTACHMENT

Filed Sept. 19, 1942  2 Sheets-Sheet 1

INVENTOR
Walter Brauer.
BY
ATTORNEY.

INVENTOR
Walter Brauer
BY C. M. McKnight
ATTORNEY

Patented Oct. 24, 1944

2,361,171

UNITED STATES PATENT OFFICE 2,361,171

UNIVERSAL MILLING ATTACHMENT

Walter Brauer, Oklahoma City, Okla.

Application September 19, 1942, Serial No. 459,031

7 Claims. (Cl. 90—17)

This invention relates to improvements in machine tools capable of performing milling, cutting and grinding operations, and more particularly, but not by way of limitation, to a universal adjustable mounting for a milling attachment utilized in combination with a shaper, miller or like machine.

It is an important object of this invention to provide a high speed mounting for a machine tool which may be universally and selectively adjusted for positioning the tool to any required angular position for utilization with the work.

And still another object of this invention is to provide an auxiliary machine tool that may be detachably secured to any shaper, milling machine, lathe and the like, and adapted for use with work table of the latter in a simple and efficient manner.

And still an additional object of this invention is to provide an auxiliary machine tool for adjustable mounting on a shaper or the like and having an efficient and simple means of securing the cutting tool.

And still another object of this invention is to provide a self-powdered auxiliary machine tool adapted to be secured on a shaper or the like and used in conjunction with the work table thereof, said tool including a spindle capable of being driven at variable speeds dependent upon the type of work being performed.

Other objects and advantages of the invention will be evident from the following detailed description read in conjunction with the accompanying drawings which illustrate one form of the invention.

In the drawings:

Fig. 4 is a fragmentary side elevational view showing the auxiliary unit supported above the work table of a shaper or the like.

Figure 1:
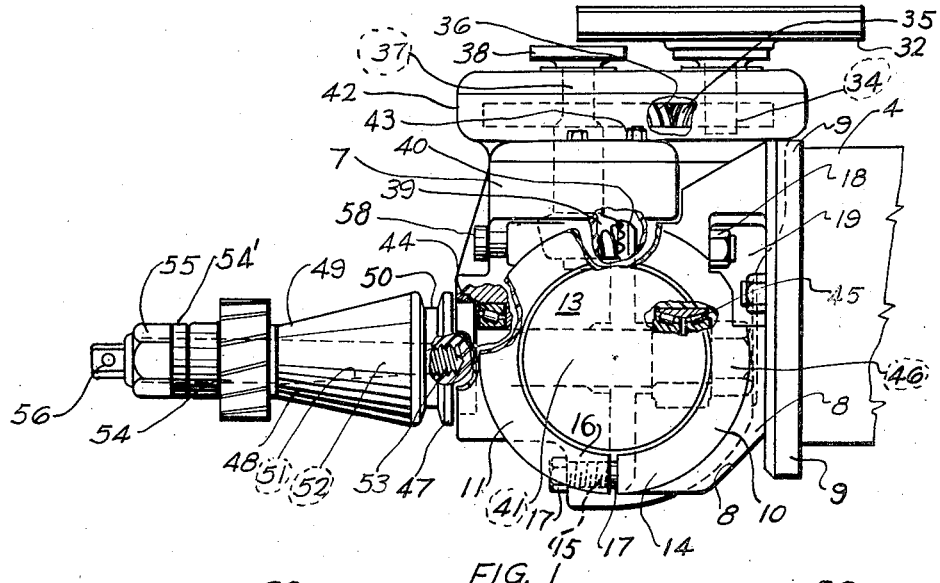
Fig. 1 is a side elevation of the auxiliary unit having certain external parts broken away in order to disclose more clearly the internal operating mechanism.

Referring to the drawings in detail and more particularly to Figs. 1–4, inclusive, the auxiliary milling unit 2 is adapted to be supported on any conventional shaper 3 having the usual ram 4. The shaper or other supporting machine is provided with the necessary work clamp 5 disposed on a reciprocating table 6. It will be apparent that the milling unit could be supported by any stand and frame having a reciprocating vice for holding the work, and is not necessarily limited to a shaper.

The milling unit 2 is detachably secured to the working end of the ram 4, it being understood that the ram is horizontally adjustable in any conventional manner (not shown) for positioning the unit 2 in proper position relative to the reciprocating work clamp 5. The unit comprises a main housing 7 for the operating mechanism thereof. The housing 7 is supported in a cradle clamping member 8 having a back or rear plate 9 adapted to be secured to the working end of the ram 4 by means of bolts or the like (not shown). The cradle clamp is provided with a pair of spaced semi-circular members 10 (only one of which is shown) cooperating with a pair of complementary semi-circular members 11 for supporting a pair of spaced cylindrical projections 13 provided at opposite sides of the main housing 7 (Fig. 2). In order to support the housing 7, the projections 13 are secured in the complementary semi-circular members 10 and 11, wherein one end portion 14 of each member 10 is provided with a threaded recess (not shown) in alignment with a threaded aperture 15 in the end portion 16 of each member 11 and receiving inset bolts 17 (Fig. 2) securing the pair of semi-circular members 10 and 11 together to effect an adjustable clamping action on the projections. The opposite end portions of the semi-circular members 10 and 11 are provided with aligned threaded apertures (not shown) receiving an adjusting bolt 18 shown in the open portion 19 of the cradle 8. Adjustment of the bolt 18 allows tightening or loosening of the semi-circular members 10 and 11 relative to the projections 13 in order to adjust the housing 7 and unit 2 in any selective angular position from that shown in Figs. 1 and 4, to that shown in Fig. 5.

As disclosed in Fig. 2 the left projection is provided with a threaded recess (not shown) adapted to receive a bolt 21 securing a part 22a of a motor bracket 22 to the projection disposed nearest the electrical motor 23. The bracket is provided with a slot 22b and screw 22c to provide adjustment of the bracket 22 relative to the housing 7. The bracket 22 is provided with a split bearing 24 receiving a motor stand shaft 25 extending from and integral with a motor stand or projection 26. The motor 23 has a flange member 27 for use in securing the motor to the stand by the bolts 28. The bearing is split (not shown) at the top thereof and carries a clamping handle 29 allowing adjustment of the shaft 25 and motor 23 relative to the housing 7 in order to provide proper tension in the drive pulleys to be hereinafter referred to. The motor 23 is provided with a pulley 30 carried by the motor shaft 31.

Figure 2:
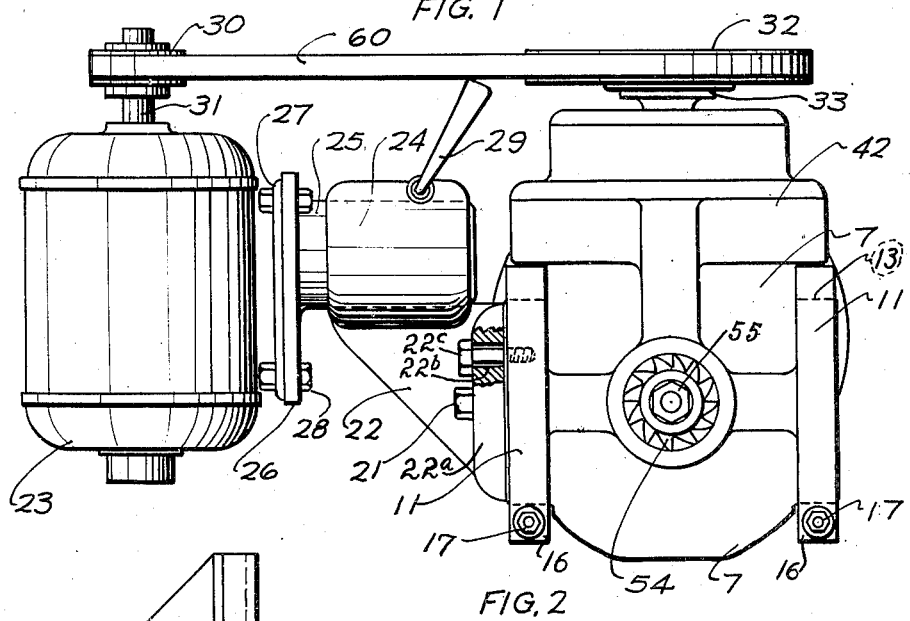
Fig. 2 is a front elevational view of the unit.
Figure 3:
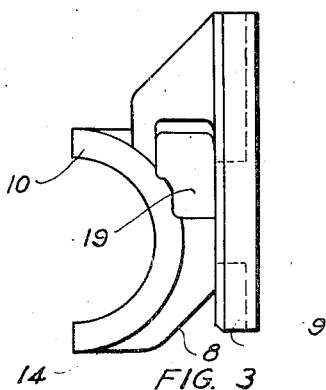
Fig. 3 is a detail view in side elevation of a portion of the cradle members supporting the tool.
Figure 4:
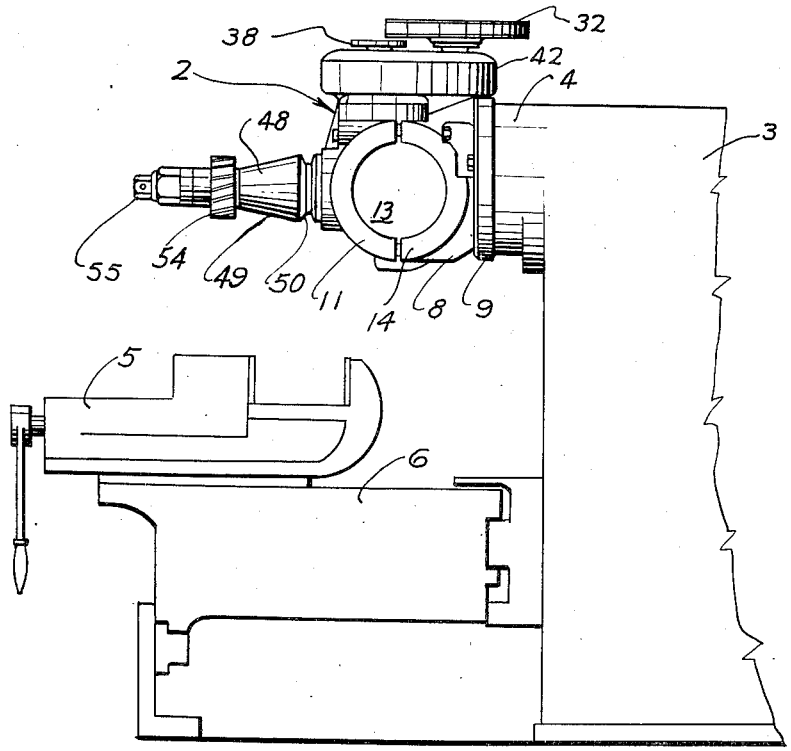

Referring to Figs. 1 and 2 a drive belt 60 connects motor pulley 30 with a pulley 32 disposed adjacent the top of the housing 7 and carried by a flanged coupling 33 pinned to a shaft 34 disposed in the housing 7. The shaft is journaled in a roller bearing (not shown) disposed in the housing. A small gear 35 is pinned to the shaft 34 and cooperates with a large gear 36 pinned to a second shaft 37 arranged in spaced relation to shaft 34, and is journaled in roller bearings disposed in the housing (not shown). The upper end portion of shaft 37 is provided with a flanged coupling 38 similar to coupling 33 for a purpose as will be hereinafter set forth. The opposite end portion of shaft 37 is provided with a beveled pinion 39 cooperating with a bevel gear 40 pinned to drive spindle 41. The upper portion of the housing 7 is segmental to provide a lid portion 42 secured to the housing 7 by bolts 43. It will be apparent that removal of the lid 42 allows access to the gears for repair, replacement and the like.

The drive spindle 41 is journaled between a single roller bearing 44 and a double bearing 45 disposed in the housing 7. The double bearing in addition to supporting the spindle acts as a thrust bearing against the large bevel gear 40, and can be adjusted by a nut 46 secured at the rear end portion of the spindle 41. At a point adjacent the front bearing 44, the spindle is provided with an annular flange 47 having an integral elongated portion 48 extending outwardly from the housing 7. The elongated portion 48 has a tapered outer periphery 49 and a V-shaped groove 50. It will be apparent that the spindle and shaft 48 are integral, comprising one unit. The shaft 48 is provided with a tapered aperture 51 receiving an arbor 52 having threads at one end thereof adapted to be threaded in a recess 53 provided in flange 47 of the spindle 41.

The milling or cutting tool 54 is disposed on the arbor 52 and secured thereon by a plurality of spacers 54' and a lock nut 55. The outer end portion of the arbor is constructed substantially hex-shape and has an aperture 56 to facilitate threading and unthreading of the arbor.

A set screw 58 is in threaded engagement with the housing 7 and is moveable into contact with the pinion 39 to lock the pinion and gear 40 against rotation when it is desired to thread the arbor 52 into the recess 53 of the spindle 41.

*Operation*

In operation the housing 7 is adjusted and clamped relative to the cradle member 8 to place the cutter 54 in any angular position from horizontal to vertical relative to the work clamp 5 on the reciprocating table 6. With the unit 2 in position, operation of the motor 23 drives the pulley 30, drive belt 60, pulley 32, gear connections 35, 36, 39 and 40 to rotate the spindle 41 which in turn rotates the arbor 52 and milling cutter 54. It will be apparent that the unit can provide variable speeds by changing the size of the drive pulleys between the motor and the unit. The unit can be supplied with different size pulleys for this purpose. Furthermore, pulley 32 can be shifted from coupling 33 to coupling 38 in order to provide a direct drive to shaft 37 whereupon the rotation of the spindle 41 is doubled since the ratio between the drive gear 35 and 36 is 2 to 1.

Figure 5:
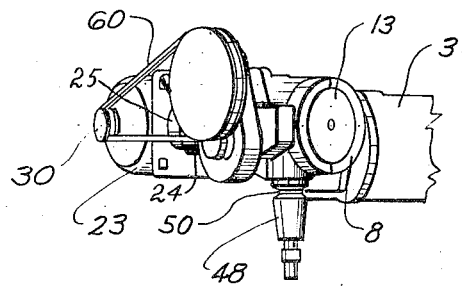
Fig. 5 is a perspective view of the milling attachment shown adjusted to position the spindle in a vertical plane.

As clearly shown in Fig. 5 loosening of the bolts 18 allows adjustment of the projections 13 and housing 7 relative to the clamping members 10 and 11 to position the spindle 41 in a vertical plane whereas it can receive a drilling, grinding or milling tool to perform these various operations. Furthermore, it will be apparent that the adjustment of the projections 13 can be made for positioning of the unit for angle milling by setting the spindle at any angle from 0 to 90 degrees.

Figure 6:
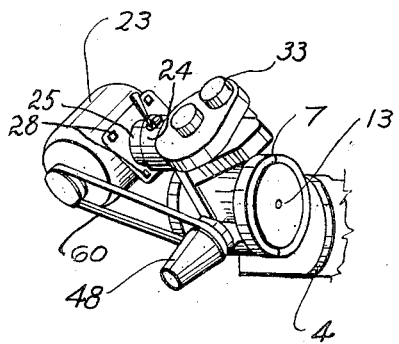
Fig. 6 is a similar view showing adjustment of the tool motor to provide a direct drive to the spindle.

In Fig. 6 the unit is shown set at an angled position and with a direct drive of the belt 60 from the motor pulley 30 to the V-shaped groove 50 of the member 48. This adaptation is advantageous for increased revolutions of the spindle 41 necessary in grinding and the like operations. It will be apparent that the position of the motor 23 must be changed on the stand 26. Furthermore, the cover plate 42 can be removed for lifting out the pinion 39 and drive shaft 37 to allow freer rotation of the spindle 41.

Alluding further to the adapter cradle 8, it will be apparent that it can be easily machined to fit different sizes of shapers or machine tools, and the cradle construction allows universal adjustment of the auxiliary unit relative to the reciprocating table 6.

From the foregoing it will be apparent that the auxiliary milling unit contemplates a light weight, small sized portable tool that can be utilized in any machine shop having a shaper or similar machine tool available. A plurality of spindle speeds may be obtained by interchanging the pulleys on the motor and the unit. The unit has roller bearings throughout to provide a noiseless and accurate operation. It will be apparent that any shaper or like machine tool can be converted into a milling machine or the like by simply attaching the cradle member to the head of the shaper ram, and adjustably supporting the independently operated auxiliary tool unit in the adapter cradle.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a structure of the character described, a support provided with co-axial substantially circular supporting elements, a housing having oppositely projecting trunnions journaled in said elements for adjustment about the axis thereof, a rotatable driven shaft journaled in the housing, arranged perpendicularly to said axis and having its axis intersecting the axis of the supporting elements, said shaft projecting from the housing, a tool mounted on the projecting portion of the shaft, a bracket mounted on one of said trunnions and adjustable about the axis of the supporting elements, a motor supported by said bracket and adjustable therewith, said motor having a rotatable shaft, and power transmitting means operatively connecting the driven shaft to the motor shaft.

2. In a structure of the character described, a support provided with co-axial substantially circular supporting elements, a housing having oppositely projecting trunnions journaled in said elements for adjustment about the axis thereof, a rotatable driven shaft journaled in the housing, arranged perpendicularly to said axis and having its axis intersecting the axis of the supporting elements, said shaft projecting from the housing, a tool mounted on the projecting portion of the shaft, a bracket mounted on one of said trunnions and adjustable about the axis of the supporting elements, a motor carried by the bracket and movable toward and away from said housing, said motor being adjustable with the bracket and having a rotatable shaft, and power transmitting means operatively connecting the driven shaft to the motor shaft.

3. In a structure of the character described, a support provided with co-axial substantially circular supporting elements, a housing having oppositely projecting trunnions journaled in said elements for adjustment about the axis thereof, a rotatable driven shaft journaled in the housing, arranged perpendicularly to said axis and having its axis intersecting the axis of the supporting elements, said shaft projecting from the housing, a tool mounted on the projecting portion of the shaft, a bracket mounted on one of said trunnions and adjustable about the axis of the supporting elements, a motor supported by said bracket and adjustable therewith, said motor having a rotatable shaft adapted to be arranged perpendicularly to the driven shaft, and power transmitting means operatively connecting the driven shaft to the motor shaft.

4. In a structure of the character described, a support provided with co-axial substantially circular supporting elements, a housing having oppositely projecting trunnions journaled in said elements for adjustment about the axis thereof, a rotatable driven shaft journaled in the housing, arranged perpendicularly to said axis and having its axis intersecting the axis of the supporting elements, said shaft projecting from the housing, a tool mounted on the projecting portion of the shaft, a driving shaft arranged perpendicularly to the driven shaft, journaled in the housing and operatively connected to the driven shaft for driving the latter, a bracket mounted on one of said trunnions and adjustable about the axis of the supporting elements, a motor supported by said bracket and adjustable therewith, said motor having a rotatable shaft, and power transmitting means operatively connecting the motor shaft to said driving shaft.

5. In a structure of the character described, a support provided with co-axial substantially circular supporting elements, a housing having oppositely projecting trunnions journaled in said elements for adjustment about the axis thereof, a rotatable driven shaft journaled in the housing, arranged perpendicularly to said axis and having its axis intersecting the axis of the supporting elements, said shaft projecting from the housing, a tool mounted on the projecting portion of the shaft, a bracket mounted on one of said trunnions and adjustable about the axis of the supporting elements, a clamping sleeve connected to the bracket, a motor having a stud extending into the clamping sleeve to permit the motor to move toward and away from said housing, said motor being adjustable with the bracket and having a rotatable shaft, and power transmitting means operatively connecting the motor shaft to said driven shaft.

6. In combination with a machine having a reciprocating work support and an over-arm arranged at a higher elevation than the work support, of a supporting member secured to the over-arm and provided with co-axial substantially circular supporting elements, a housing having oppositely projecting trunnions journaled in said elements for adjustment about the axis thereof, a rotatable driven shaft journaled in the housing, arranged perpendicularly to said axis and having its axis intersecting the axis of the supporting elements, said shaft projecting from the housing, a tool mounted on the projecting portion of the shaft, a bracket mounted on one of said trunnions and adjustable about the axis of the supporting elements, a motor supported by said bracket and adjustable therewith, said motor having a rotatable shaft, and power transmitting means operatively connecing the driven shaft to the motor shaft.

7. In a structure of the character described, a support provided with co-axial substantially cylindrical supporting elements, a housing having oppositely projecting trunnions journaled in said elements for adjustment about the axis thereof, a rotatable driven shaft journaled in the housing, arranged perpendicularly to said axis and having its axis substantially intersecting the axis of the supporting elements, said shaft projecting from the housing, a tool mounted on the projecting portion of the shaft, a gear fixed to the shaft and arranged within the housing, a driving shaft journaled in the housing and projecting from the same at right angles to the axis of the driven shaft, power transmitting means including a gear connected to the driving shaft and meshing with the gear on the driven shaft, a bracket mounted on one of said trunnions and adjustable about the axis of the supporting elements, a motor supported by said bracket and adjustable therewith, said motor having a rotatable shaft, and other power transmitting means operatively connecting the motor shaft to the driving shaft.

WALTER BRAUER.